Dec. 23, 1969   P. R. KINTZINGER   3,486,121
TIMING CIRCUIT PROVIDING PREARRANGED SEQUENCES OF OUTPUT PULSES
Filed July 13, 1966   2 Sheets-Sheet 2
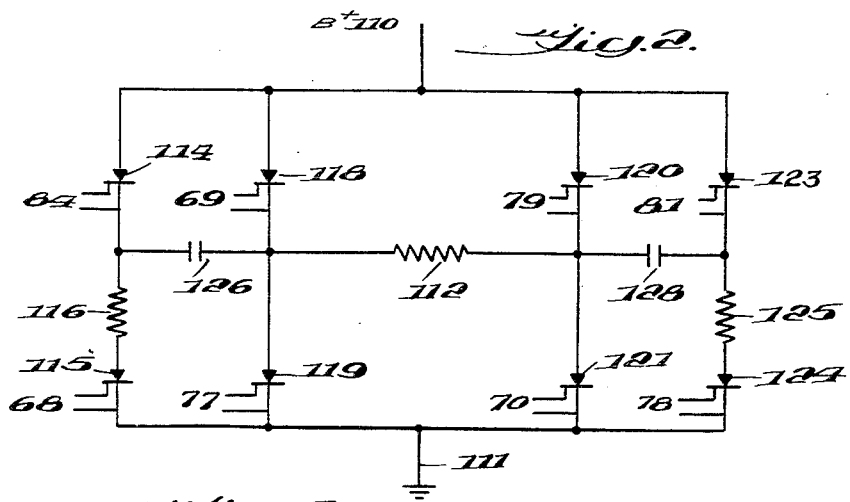
Fig. 2.
Fig. 3.
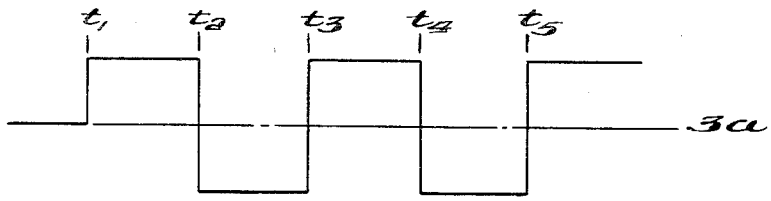
3a
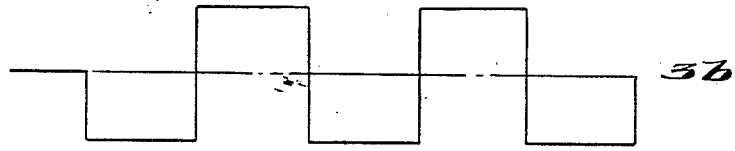
3b
3c
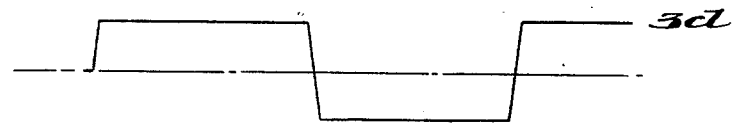
3d
3e
INVENTOR.
PAUL R. KINTZINGER,
BY McKean, Morton and Braistead
ATTORNEYS

United States Patent Office 3,486,121
Patented Dec. 23, 1969

3,486,121
TIMING CIRCUIT PROVIDING PREARRANGED SEQUENCES OF OUTPUT PULSES
Paul R. Kintzinger, Tulsa, Okla., assignor, by mesne assignments, to Sinclair Research, Inc., New York, N.Y. a corporation of Delaware
Filed July 13, 1966, Ser. No. 564,971
Int. Cl. H03k 1/12, 3/04
U.S. Cl. 328—62                                    5 Claims

ABSTRACT OF THE DISCLOSURE

A timing circuit for providing prearranged sequences of output pulses. Each half-cycle from an alternating function generator activates a selected trigger circuit which in turn activates a selected pulsing circuit to generate an output pulse. After a preselected first delay, another pulsing circuit is activated to generate another output pulse. At the next half-cycle from the function generator, another preset pulse pattern is generated. Switching permits additional variations to provide additional pulse patterns.

---

This invention relates to a timing circuit for providing output pulses in a pre-arranged sequence and, more particularly, to an electrically interlocked sequential switching circuit wherein the period of the pulses at the various output terminals can be altered by a connection interchange between component units of the circuit.

The timing circuit of this invention generally includes a low frequency alternating current function generator, one output terminal of which is connected to a first set of negative pulse actuated dual triggering circuits, one of the triggering circuits of the set being held off by a feedback control from a first control multivibrator. The output of the activated triggering circuit is subsequently fed through a second control multivibrator and delay multivibrator, the delay interval of which is small in comparison to the period of the waveform output of the function generator, to trigger simultaneously three pulse generating circuits thereby producing gating pulses on three diverse output terminals.

The second output terminal of the function generator is connected to a second set of negatively activated dual triggering circuits, one of the triggering circuits of the set being held off by a feedback control from the second control multivibrator. The output of the activated triggering circuit of the set is fed as a switching pulse to the first multivibrator thereby altering its state and energizing a single pulse generating circuit to produce a gating pulse upon a fourth output terminal.

The next succeeding half cycle of the function generator switches that triggering circuit which was held inactivated on the previous cycle by the feedback control from the first multivibrator and the output of the activated triggering circuit is fed to the second control multivibrator to alter its state and produce a pulse which, after a time delay, simultaneously activates a second group of three pulse generators to produce gating pulses on a second set of three diverse output terminals. The following half cycle of the function generator switches that triggering circuit which was held inactivated on the previous cycle of the function generator by the feedback control from the second multivibrator. The output pulse of the switched triggering circuit is subsequently fed to the first multivibrator altering its state and energizing a second individual pulse generating circuit to produce a gating pulse upon an eighth output terminal.

A second delay multivibrator having a delay interval less than the delay period of the first delay multivibrator is connected to the output of the first multivibrator and functions to alternately activate two individual pulse generating circuits thereby producing gating voltages alternately upon individual output terminals of each set of the three simultaneously activated circuits.

Thus a train of pulses are produced at the output terminals of the timing circuit in the sequence 3, 1, 1, 3, 1, 1, each pulse group having a waveshape fixed by the inherent characteristics of the pulsing circuitry with the simultaneously energized output terminals being displaced in time from the individually energized output terminals by an interval of approximately one half the period of the function generator.

A two position double pole switch connected between the first control multivibrator and the single pulse generating circuits of the individually activated switching circuit and adapted to switch the energization of the pulse generating circuits from the first control multivibrator to the second control multivibrator functions to alter the sequence of operation and interval between the successive output pulses. By energizing the single pulse generating circuits of the individually activated switching circuit from the output of the second control multivibrator, a time variation of one half the period of the function generator waveform is effectuated in the output gating pulses of the individual pulse generating circuits, without alteration of the phase position of the output gating pulses of the plural pulse generating circuit relative to the function generator output. Thus, a train of output pulses are produced at the output terminals in the sequence of 1, 1, 3, 1, 1, 3, each pulse group having a period fixed by the waveshaping characteristics inherent in the pulsing circuitry with the simultaneously energized output terminals being displaced in time from the succeeding individually activated terminals by an interval equal to the period of the function generator less the delay time of the delay multivibrator.

A more complete understanding of the basic principles of this invention can be obtained by reference to the appended drawings wherein:

FIGURE 2 is a circuit diagram of a controlled rectifier bridge inverter, the operation of which is regulated by the timing circuit of this invention, and FIGURE 3 is a diagram portraying the waveforms present within the component circuitry of this invention at various time intervals.

Figure 1:
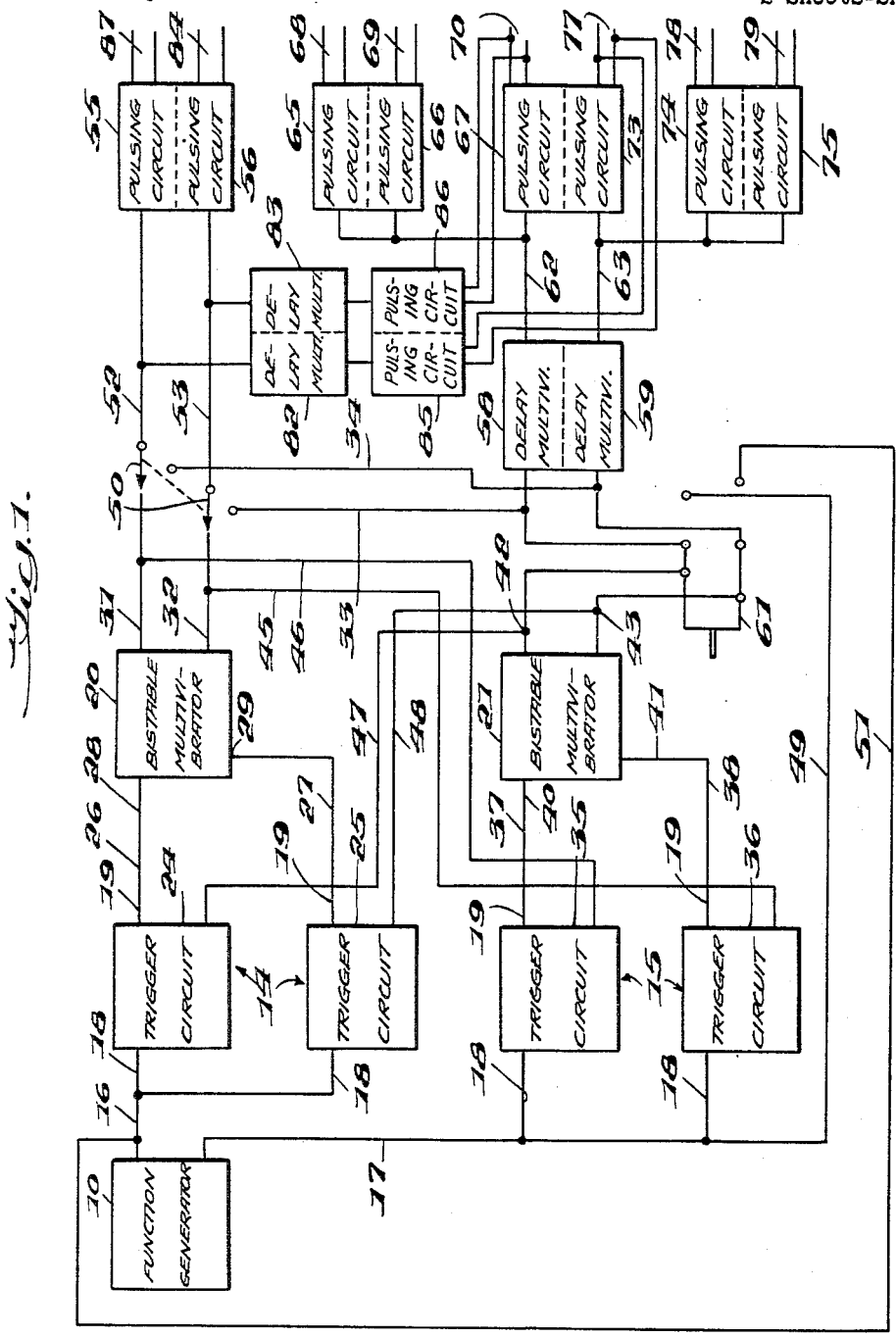
FIGURE 1 is a block diagram of the timing circuit of this invention.

Referring more particularly to the timing circuit portrayed in FIGURE 1, low frequency function generator 10 produces an alternating current output voltage which is converted by the timing circuit into a series of sequential gating pulses to control the operation of the bridge inverter of FIGURE 2. The low frequency generator preferably produces a square wave output which is fed as an input to two sets of identically connected dual triggering circuits 14 and 15 by conductors 16 and 17, respectively. A negative pulse on input terminals 18 of the individual triggering circuits tends to switch the triggering circuits thereby producing a voltage upon output terminals 19 which, in turn, is fed as an input to bistable multivibrators 20 and 21. Thus, the pulses on output teminals 19 of individual triggering circuits 24 and 25 composing dual triggering circuit 14 are fed as switching pulses by leads 26 and 27 to input terminals 28 and 29, respectively, of multivibrator 20 to alter its mode of operation and produce a reversal in polarity upon output terminals 31 and 32 of multivibrator 20. Similarly, the pulses on output terminals 19 of individual triggering circuits 35 and 36 composing dual triggering circuit 15 are fed as switching pulses by leads 37 and 38 to input terminals 40 and 41, respectively, of multivibrator 21 to alter its mode of operation and produce a reversal of polarity upon output terminals 42 and 43 of multivibrator 21.

A hold-off voltage from each of output terminals 31 and 32 of multivibrator 20 is fed back to triggering circuits 35 and 36 by leads 45 and 46, respectively, while a hold-off feedback voltage from each of output terminals 42 and 43 is applied to triggering circuits 24 and 25 by leads 47 and 48, respectively. Because the output voltage of multivibrator 20 upon terminals 31 and 32 will vary alternately from positive to negative dependent upon its mode of operation with output terminals 31 and 32 always having opposite polarities, one triggering circuit of dual circuit 15 will be held off by the inhibiting voltage fed back from multivibrator 20 when a negative switching pulse from function generator 10 is applied simultaneously as an input to triggering circuits 35 and 36 by conductor 17. Similarly, one triggering circuit of dual circuit 14 will be held off by the feedback voltage from multivibrator 21 when a negative switching pulse from function generator 10 is applied as an input to triggering circuits 24 and 25 by conductor 16.

Thus, on a first half cycle of function generator 10 with a positive pulse on conductor 16 and a negative pulse on conductor 17, triggering circuit 35 will be activated while triggering circuit 36 will be held off by the feedback voltage from multivibrator 20 thereby reversing the polarity of the output voltage on terminals 42 and 43 which, in turn, is fed back to dual triggering circuits 14 by conductors 47 and 48. On the next half cycle of function generator 10, a negative pulse is applied to triggering circuits 24 and 25 activating circuit 24 while trigger circuit 25 is held off by the feedback voltage from multivibrator 21. The output of circuit 24 switches the mode of operation of bistable multivibrator 20 to reverse the polarity of both the output voltage on terminals 31 and 32 and the feedback voltage to dual triggering circuit 15. On the succeeding half cycle of function generator 10 following the activation of circuit 24 when a negative pulse is applied to dual circuit 15 by conductor 17, triggering circuit 36 is activated with triggering circuit 35 being held off by the feedback voltage from multivibrator 20 on lead 46. The output of triggering circuit 36 swtches the mode of operation of multivibrator 21 thereby reversing the polarity both of output terminals 42 and 43 and feedback leads 47 and 48 so that the next negative half cycle of function generator 10 on lead 16 activates triggering circuit 25 to switch bistable multivibrator 20. Thus, each of triggering circuits 24, 25, 35 and 36 is activated once for every two cycles of function generator 10 while bistable multivibrators 21 and 22 are switched from their first mode of operation to a second mode and back to their first mode during the same interval.

The output voltage of bistable multivibrator 20 upon terminals 31 and 32 is fed through upwardly closed two position switch 50 and leads 52 and 53 to alternately energize pulsing circuits 55 and 56, respectively, dependent upon the polarity of leads 52 and 53 as determined by the mode of operation of multivibrator 20. Similarly the output voltage of bistable multivibrator 21 upon output terminals 42 and 43 is fed through leftwardly closed double pole, double throw switch 61 to dual time delay multivibrators 58 and 59 thereby alternately energizing leads 62 and 63 respectively dependent upon the mode of operation of bistable multivibrator 21. Energization of lead 62 simultaneously activates pulsing circuits 65, 66 and 67 to produce a gating voltage upon output leads 68, 69 and 70, respectively, while the energization of lead 63 by delay multivibrator 59 simultaneously activates pulsing circuits 73, 74 and 75 to produce coincident gating voltages upon output leads 77, 78 and 79 respectively. Because the timing circuit of this invention has particular utility in controlling the operation of a controlled rectifier bridge inverter, as will be more fully explained with reference to FIGURE 2, the delay interval of multivibrators 58 and 59 is fixed approximately at the recommended commutating period for the controlled rectifiers utilized in the bridge.

A second set of dual time delay multivibrators 82 and 83 are connected to input leads 52 and 53 and function, upon receipt of an alternately activating pulse on leads 52 and 53, respectively, to energize pulsing circuits 85 and 86 after a delay interval approximately one half the delay interval of delay multivibrators 58 and 59. The energization of pulsing circuits 85 and 86 produces gating pulses upon terminals 77 and 70 which are delayed from the outputs of pulsing circuits 55 and 56, respectively, by a period equal to the delay interval of multivibrators 82 and 83.

Thus, with a negative cycle of function generator 10 being applied to dual triggering circuits 15 to activate triggering circuit 35 and switch multivibrator 21 to its alternate mode of operation, the output voltage from multivibrator 21 on terminal 42 is fed to pulsing circuits 65, 66 and 67 after a short delay interval provided by delay multivibrator 58 thereby producing simultaneous gating pulses on output terminals 68, 69 and 70 of the pulsing circuits. After a period of one half the cycle of function generator 10, a negative cycle activates triggering circuit 24 to switch multivibrator 20 thereby energizing pulsing circuit 55 to produce a gating pulse on output terminals 87. The identical pulse which triggers pulsing circuit 55 is fed through delay multivibrator 82 and pulsing circuit 85 to produce a gating voltage output on terminals 77. The next negative pulse to dual gating circuits 15, ocurring one half cycle of function generator 10 after energization of pulsing circuit 55 and output terminals 87, activates triggering circuit 36 to switch the mode of operation of bistable multivibrator 21 thereby simultaneously energizing pulsing circuits 73, 74 and 75 after a short delay interval in multivibrator 59. Upon elapse of one half cycle of function geenrator 10 from the activation of triggering circuit 36, triggering circuit 25 is energized to switch multivibrator 20 and produce a gating voltage upon output terminals 84 of pulsing circuit 56. The output voltage or lead 53 which activated pulsing circuit 56, after a delay in multivibrator 83, switches pulsing circuit 86 to energize output terminals 70.

Thus, with two position switch 50 in its upward position, double pole switch 61 in its leftwardly engaged position and function generator 10 providing an output waveform relative to the initial mode of operation of dual triggering circuits 14 and 15 and multivibrators 20 and 21 to fix the order of sequential actuation of the triggering circuits as 35, 24, 36 and 25, respectively, the first half cycle of function generator 10 produces simultaneous gating pulses upon output terminals 68, 69 and 70 of pulsing circuits 65, 66 and 67 after a period fixed by delay multivibrator 58. The succeeding half cycle of function generator 10 immediately energizes pulsing circuit 55 to provide a gating output voltage upon terminals 87 and, after a time delay fixed by multivibrator 82, a gating output voltage upon terminals 77. Output terminals 77, 78 and 79 are simultaneously energized after the delay interval of multivibrator 59 upon the next half cycle of function generator 10 following the energization of pulsing circuit 55. The succeeding half cycle of the function generator following the simultaneous energization of output terminals 77, 78 and 79 produces a gating voltage upon output terminals 84 and, after a delay fixed by multivibrator 83, pulsing circuit 86 is energized to produce an output voltage upon terminals 70.

Assuming functiion generator 10 at time $t$ to produce a waveform having a period T with delay multivibrators 58 and 59 having a delay interval $d$ and delay multivibrators 82 and 83 providing a delay interval of $d/2$, coincident output pulses are produced upon terminals 68, 69 and 70 at time $t+d$ upon terminals 87 at time $t+T/2$, and at terminals 77 at $t+T/2+d/2$. Simultaneous output pulses are provided on gating terminals 77, 78 and 79 at time $t+T+d$ with gating output terminals 84 being energized at $t+3T/2$ and gating output terminals 70 being energized at $t+3/2T+d/2$. The cycle of output gating pulses is repeated with coincident gating pulses occurring upon output terminals 68, 69 and 70 at $t+2T+d$.

When two position switch 50 is thrown into its downward position, conductors 52 and 53 are energized by the voltage upon output terminals 42 and 43 of multivibrator 21 through conductors 33 and 34 and leftwardly positioned switch 61 with multivibrator 20 and dual triggering circuit 14 being isolated from the pulsing circuits by the downwardly positioned switch 50. The feedback voltage from multivibrator 20 to dual triggering circuit 15 upon conductors 45 and 46 as well as the interconnection between dual triggering circuit 14 and multivibrator 20 remain unaffected by the positioning of dual position switch 50 to insure alternation of switching between triggering circuits 35 and 36. The identical pulse upon output terminal 42 of multivibrator 21, which simultaneously activates pulsing circuits 65, 66 and 67 after a delay in multivibrator 58, acts as a source of energization upon conductor 53 for pulsing circuit 56. After a delay period produced within delay multivibrator 83, pulsing circuit 86 also is activated by the energization of conductor 53 to produce an output gating pulse on terminals 70. Similarly, the output pulse on terminal 43 of multivibrator 21 energizes conductors 34 and 52 to produce a gating signal upon terminals 87 of pulsing circuit 55 and, after a time delay provided by delay multivibrator 82, pulsing circuit 85 is activated to provide a gating pulse on output terminals 77. The energizing voltage on output terminal 43 of multivibrator 21 is fed through delay multivibrator 59 to simultaneously activate output terminals 77, 78 and 79 after a fixed interval. By maintaining the delay intervals of delay multivibrators 82 and 83 at approximately one half the delay interval of delay multivibrators 58 and 59, the individual energizations of output terminals 70 and 77 occur prior to the simultaneous output terminal activation containing terminals 70 and 77.

With two position switch 50 in in its downward location, double pole switch 61 in its leftward position and function generator 10 providing an output waveform relative to the mode of operation of the timing circuit component circuitry to activate triggering circuits 35, 24, 36 and 25 in sequential order, the first half cycle of function generator 10 immediately activates pulsing circuit 56 through downwardly positioned switch 50 and double pole switch 61 to produce a pulse upon terminals 84. After a time delay fixed by multivibrator 83, pulsing circuit 86 energizes output terminals 70 with pulsing circuits 65, 66 and 67 being activated after the delay period fixed by multivibrator 58 to produce coincident gating signals on output terminals 68, 69 and 70. The succeeding half cycle of function generator 10 produces no effect upon the output gating signals but merely prepares triggering circuit 36 for subsequent activation. The next half cycle of the function generator thereupon switches the mode of operation of multivibrator 21 to energize pulsing circuit 55 and produce a gating signal on output terminals 87. After a time delay fixed by multivibrator 82 pulsing circuit 85 energizes output terminals 77 with pulsing circuits 73, 74 and 75 being activated after a delay period fixed by multivibrator 59 to produce simultaneous gating signals on output terminals 77, 78 and 79.

Once again assuming function generator 10 at time $t$ to produce a waveform having a period T with delay multivibrators 58 and 59 having a delay interval $d$ and delay multivibrators 82 and 83 providing a delay interval of $d/2$, when switch 50 is in its downward position and double pole switch 61 is leftwardly thrown an output pulse is produced upon gating terminals 84 at time $t$, upon terminals 70 at $t+d/2$, and simultaneously upon terminals 68, 69 and 70 at $t+d$. Similarly, at $t+T$, gating terminals 87 are energized by pulsing circuit 55 with output terminals 77 being activated by pulsing circuit 85 at time $t+T+d/2$. Coincident gating signals are produced upon terminals 77, 78 and 79 by pulsing circuits 73, 74 and 75, respectively, at time $t+T+d$. The cycle of output gating pulses is repeated with an output signal occurring upon gating terminal 84 at time $t+2T$.

With dual position switch 50 downwardly engaged, the closure of double pole switch 61 in its rightward position directly connects the output of function generator 10 to the inputs of delay multivibrators 58 and 59 and pulsing circuits 55 and 56 by means of conductors 49 and 51 to effectively isolate the outputs of bistable multivibrators 20 and 21 from the pulsing circuitry. Because each half cycle of function generator 10 alternately triggers delay multivibrators 58 and 59 and pulsing circuits 55 and 56, an exact doubling of the frequency of the gating outputs from the pulsing circuits is obtained over the circuit configuration of FIGURE 1 with double pole switch in its leftward position. Thus, the first half cycle of function generator 10 immediately activates pulsing circuit 56 through rightwardly positioned double pole switch 61 to produce a pulse upon terminals 84. After a time delay fixed by multivibrator 83 pulsing circuit 86 energizes output terminals 70 with pulsing circuits 65, 66 and 67 being activated after the delay period fixed by multivibrator 58 to produce coincident gating signals on output terminals 68, 69 and 70. The succeeding half cycle of function generator 10, rather than being merely a preparatory pulse for the dual triggering circuits as when double pole switch is leftwardly engaged, energizes pulsing circuit 55 to produce a gating signal on output terminals 87. After a time delay fixed by multivibrator 82 pulsing circuit 85 energizes output terminals 77 with pulsing circuits 73, 74 and 75 being activated after a delay period fixed by multivibrator 59 to produce simultaneous gating signals on output terminals 77, 78 and 79. The cycle of gating signal outputs from the pulsing circuit is repeated with each succeeding cycle of function generator 10 thereby producing an output pulsing frequency identical to the frequency of function generator 10.

Assuming function generator 10 at time $t$ produces a waveform having a period T with delay multivibrators 58 and 59 having a delay interval $d$ and delay multivibrators 82 and 83 providing a delay interval $d/2$, when switch 50 is in its downward position and double pole switch 61 is rightwardly thrown an output pulse is produced upon gating terminals 84 at time $t$, upon terminals 70 at $t+d/2$ and simultaneously upon terminals 68, 69 and 70 at $t+d$. Similarly, at time $t+T/2$, gating terminals 87 are energized by pulsing circuit 55 with output terminals 77 being activated by pulsing circuit 85 at time $t+T/2+d/2$. Coincident gating signals are produced upon terminals 77, 78 and 79 by pulsing circuits 73, 74 and 75, respectively, at time $t+T/2+d$. The cycle of output gating pulses is repeated with an output signal occurring upon gating terminals 84 at $t+T$.

Because hold-off circuits, multivibrators and delay multivibrators as well as the wave shaping differentiating circuits employed as the pulsing circuits of this invention are well known, no explanation of their internal circuitry is provided.

Referring more particularly to the controlled rectifier bridge of FIGURE 2, four parallel circuits are provided between positive voltage source 110 and ground 111 to alternate and commutate the flow of current through load 112. The parallel circuits respectively include the series connection of controlled rectifiers 114 and 115 and resistor 116, the series connection of controlled rectifiers 118 and 119, the series connection of controlled rectifiers 120 and 121, and the series connection of controlled rectifiers 123 and 124 and resistor 125. A first commutating capacitor 126 is connected between the junctions formed by series connected controlled rectifiers 118 and 119 and the series connection of controlled rectifier 114 and resistor 116 while a second commutating capacitor 128 is connected between the junctions formed by series connected controlled rectifiers 120 and 121 and the series connection of controlled rectifier 123 and resistor 125. Load 112 is connected between the junctions formed by series connected controlled rectifiers 118 and 119 and series connected controlled rectifiers 120 and 121.

The gating outputs from the timing circuit of FIGURE 1 are applied between the gate and cathode of each of the bridge controlled rectifiers with terminals 84 gating controlled rectifier 114, terminals 87 gating controlled rectifier 123, terminals 68 gating controlled rectifier 115, terminals 69 gating controlled rectifier 118, terminals 70 gating controlled rectifier 121, terminals 77 gating controlled rectifier 119, terminals 78 gating controlled rectifier 124 and terminals 79 gating controlled rectifier 120.

Referring more particularly to the input waveforms of FIGURE 3, square wave 3a depicts the voltage wave applied to conductor 16 by function generator 10 and square wave 3b depicts the voltage waveform applied to conductor 17 by function generator 10. At time t1, with dual position switch 50 in its upward position and double pole switch 61 leftwardly engaged, the positive pulse on conductor 16 produce no effect upon dual triggering circuit 14 while negative pulse 3b activates triggering circuit 35 with triggering circuit 36 being held off by the voltage feedback from bistable multivibrator 20. The output of triggering circuit 35 switches the mode of operation of bistable multivibrator 21 and, after a time lapse in delay multivibrator 58, activates pulsing circuits 65, 66 and 67 to produce gating voltages upon terminals 68, 69 and 70 thereby initiating conduction of controlled rectifiers 115, 118 and 121, respectively. Load 112 is energized in a first direction, as can be seen from the load current waveform in FIGURE 3c, by current flowing from source 110 through controlled rectifier 118, load 112 and controlled rectifier 121 to ground 111, while commutating capacitor 126 is charged to the value of source 110 through controlled rectifiers 118 and 115 and resistor 116.

At time t2, the output voltage of function generator 10 reverses polarity to apply a negative pulse to conductor 16 thereby activating triggering circuit 24 with triggering circuit 25 being retained inoperative by the hold-off voltage fed back from multivibrator 21 upon lead 48. The output of triggering circuit 24 switches the mode of operation of multivibrator 20 to reverse the polarity of the output voltage on terminals 31 and 32 thereby activating pulsing circuit 55 and conditioning triggering circuit 36 for subsequent operation. The activation of pulsing circuit 55 initiates conducton of controlled rectifier 123 which, in turn, commutates conduction of controlled rectifier 118 by applying the charge voltage of previously energized capacitor 126 across the conducting terminals of controlled rectifier 118. After the elapse of the delay period of multivibrator 82 from the initiation of conduction of controlled rectifier 123, an energizing pulse is applied to controlled rectifier 119 from pulsing circuit 85 thereby assuring cessation of conduction of controlled rectifier 121.

Current through load 112 remains terminated until time t3 when a negative pulse on lead 17 activates triggering circuit 36 producing a voltage on lead 41 which switches the mode of operation of multivibrator 21 and, after a time delay in multivibrator 59, energizes pulsing circuits 73, 74 and 75 to gate controlled rectifiers 119, 124 and 120 into conduction. Load 112 is energized in a second direction by current flowing from source 110 through controlled rectifier 120, load 112 and controlled rectifier 119 to ground 111 while commutating capacitor 128 is charged to the value of source 110 through controlled rectifiers 120 and 124 and resistor 125. Conduction through load 112 continues until time t4 when a negative pulse on lead 16 from function generator 10 activates triggering circuit 25 to switch the mode of operation of multivibrator 20 thereby energizing pulsing circuit 56 to trigger controlled rectifier 114 into conduction. The conduction of controlled rectifier 114 commutates controlled rectifier 120 and, after a delay produced in multivibrator 83, pulsing circuit 86 is activated to energize controlled rectifier 121 and insure commutation of controlled rectifier 119. Current through load 112 remains terminated until time t5 when the cycle initiated at time t1 is repeated.

When two position switch 50 is in its downward position thereby connecting conductors 52 and 53 to the output of bistable multivibrator 21 and double pole switch 61 is leftwardly engaged, a negative pulse from function generator 10 on conductor 17 at time t1 activates triggering circuit 35 to switch the mode of operation of bistable multivibrator 21 and produce an output pulse from pulsing circuit 56 which triggers controlled rectifier 114 into conduction. After a time delay in multivibrator 83, pulsing circuit 86 is activated to trigger controlled rectifier 121 into conduction. Because controlled rectifiers 123 and 121 are separately gated by a pulse having time interval less than the delay interval of multivibrator 83, initially there is no closed path for current to flow. After a delay interval from time t1 produced by delay multivibrator 58, pulsing circuits 65, 66 and 67 are activated by the output of multivibrator 21 to trigger controlled rectifiers 115, 118 and 121 respectively into conduction. Load 112 is energized in a first direction by current flowing from source 110 through controlled rectifier 118, load 112, and controlled rectifier 121 to ground 111, as depicted by load waveform 3d, while commutating capacitor 126 is charged to the value of source 110 through controlled rectifiers 118 and 115 and resistor 116.

At the time t2, triggering circuit 24 is energized by the negative output of function generator 10 applied to conductor 16 to switch the mode of operation of multivibrator 20 and reverse the polarity upon feedback leads 45 and 46. Because multivibrator 20 is isolated from pulsing circuits 55 and 56 by the downward position of two position switch 50 and because triggering circuits 35 and 36 initially remain unaffected by the reversal in feedback polarity due to the positive polarity on conductor 18, no alteration in current flow through load 112 is produced at time t2.

At time t3, the negative pulse from function generator 10 activates triggering circuit 36 producing an output voltage upon conductor 41 which functions to switch the mode of operation of bistable multivibrator 21. The switching of multivibrator 21 activates pulsing circuit 55 to trigger controlled rectifier 123 into conduction thereby commutating the conduction of controlled rectifier 118 by the voltage upon previously charged capacitor 128. After a delay within multivibrator 82, pulsing circuit 85 is energized to produce a pulse on output terminals 77 thereby triggering controlled rectifier 119 into conduction and assuring commutation of controlled rectifier 121. After a delay from time t3 produced by multivibrator 59, pulsing circuits 73, 74 and 75 are activated to trigger controlled rectifiers 119, 124 and 120, respectively, into conduction. Load 112 is energized in a second direction by current flowing from source 110 through controlled rectifier 120, load 112 and controlled rectifier 119 to ground 111 while commutating capacitor 128 again is charged to the value of source 110 through controlled rectifiers 120 and 124 and resistor 125. Thus, a commutating period is provided between termination of conduction in a first direction and initiation of conduction in the second direction by the period of the delay multivibrators of the timing circuit.

The negative pulse from function generator 10 on lead 16 at time t4 activates triggering circuit 25 to switch the mode of operation of multivibrator 20 thereby reversing the polarity of the feedback voltage on leads 45 and 46 and preparing dual triggering circuit 15 for subsequent operation.

Therefore, when the succeeding half cycle of function generator 10 is applied to dual triggering circuit 15 at time t5, triggering circuit 35 is activated to switch the mode of operation of bistable multivibrator 21 thereby immediately energizing pulsing circuit 56 to produce a gating voltage pulse upon terminals 84. The gating voltage pulse upon terminals 84 triggers controlled rectifier 114 into conduction to impress the voltage upon previously charged capacitor 126 across controlled rectifier 120 thereby commutating its conduction. After a time delay in multivibrator 83, pulsing circuit 86 triggers controlled rectifier 121 into conduction to assure the commutation of controlled rectifier 119. Upon elapse of the delay interval from time $t5$ produced by multivibrator 58, pulsing circuits 65, 66 and 67 are activated by the output of multivibrator 21 to trigger controlled rectifiers 115, 118 and 121, respectively, into conduction. Current again passes through load 112 in its first direction and the alternating cycle of current through load 112 repeats until de-energization of function generator 10 or alteration in the positioning of two position switch 50.

When two position switch 50 is downwardly engaged and double pole switch 61 is rightwardly positioned, a negative pulse from function generator 10 on conductor 17 at time $t1$ activates pulsing circuit 56 to trigger controlled rectifier 114 into conduction. After a delay in multivibrator 83, pulsing circuit 86 is activated to trigger controlled rectifiers 121 into conduction. Because the purpose of initiating conduction of controlled rectifier 121 is to assure termination of conduction of controlled rectifier 119, the initial energization of controlled rectifier 121 is without purpose due to the fact that controlled rectifier 119 is not conducting at this time. After a delay interval from time $t1$ produced by delay multivibrator 58, pulsing circuits 65, 66 and 67 are activated by the output of function generator 10 to trigger controlled rectifiers 115, 118 and 121, respectively, into conduction. Load 112 is energized in a first direction by current flowing from source 110 through controlled rectifier 118, load 112 and controlled rectifier 121 to ground 111 as depicted in load waveform 3e while commutating capacitor 126 is charged to the value of source 110 through controlled rectifiers 118 and 115 and resistor 116.

At time $t2$, the succeeding half cycle of function generator 10 activates pulsing circuit 55 to trigger controlled rectifier 123 into conduction thereby commutating the conduction of controlled rectifier 118. After a delay within multivbrator 82, pulsing circuit 85 is energized to produce a pulse on output terminals 77 thereby triggering controlled rectifier 119 into conduction and assuring commutation of controlled rectifier 121. After a delay from $t2$ produced by multivibrator 59, pulsing circuits 73, 74 and 75 are activated to trigger controlled rectifiers 119, 124 and 120, respectively, into conduction. Load 112 is energized in a second direction by current flowing from source 110 through controlled rectifier 120, load 112 and controlled rectifier 119 to ground 111 while commutating capacitor 128 again is charged to the value of source 110 through controlled rectifiers 120 and 124 and resistor 125. Thus, a commutating period is provided between termination of conduction in a first direction and initiation of conduction in the second direction by the delay period of multivibrators 58 and 59 of the timing circuit.

At time $t3$, a negative pulse on lead 16 again activates pulsing circuit 56 to repeat the gating output voltage cycle initiated at time $t1$. Thus, when double pole switch 61 is rightwardly disposed, the frequency of the pulsing output from the timing circuit is identical to the frequency of function generator 10.

The claims:
1. A timing circuit for providing prearranged sequences of output pulses comprising alternating current waveform generating means having a plurality of outputs, first and second sets of dual triggering circuits, each triggering circuit of each set having an input and an output, each set being connected to an output of said generating means whereby the first set and the second set receive alternate polarities of alternate current waveform from said generating means, first and second bistable means each having dual inputs and dual outputs, each input of said first bistable means being connected to outputs of the individual triggering circuits of said first set and each input of said second bistable means being connected to outputs of the individual triggering circuits of said second set, feedback means from said first bistable means to said second set of dual triggering circuits to hold-off an individual triggering circuit of said second set, feedback means from said second bistable means to said first set of dual triggering circuits to hold-off an individual triggering circuit of said first set, individual pulsing circuits connected to each output of said first bistable means, a plurality of pulsing means connected to each output of said second bistable means to produce, upon energization, output voltages upon a plurality of output terminals, and delay means coupling the outputs of said first bistable means to individual terminals of said plurality of output terminals to produce outputs on said individual terminals at time intervals differing from the energization time of said plurality of pulsing means.

2. A timing circuit according to claim 1 including means connected intermediate (a) said first bistable means and (b) said individual pulsing circuits and said delay means to switch the energization of said individual pulsing circuits and said individual terminals from the outputs of said first bistable means to the outputs of said second bistable means.

3. A timing circuit according to claim 1 including second delay means connected between said second bistable means and said plurality of pulsing means, the delay interval of said second delay means being greater than the delay interval of said first delay means.

4. A timing circuit for providing prearranged sequences of output pulses comprising alternating current waveform generating means having a plurality of outputs, individual pulsing circuits connected to each output of said alternating current waveform generating means, first delay means connected to each output of said alternating current waveform generating means, a plurality of pulsing means connected to said first delay means to produce, upon energization, output voltages upon a plurality of output terminals, and second delay means connected to each output of said alternating current waveform generating means to produce a voltage output upon individual terminals of said plurality of output terminals, said second delay means having a delay period differing from said first delay means.

5. A timing circuit according to claim 4 including switching means intermediate (a) said generating means and (b) said first delay means, said second delay means and said individual pulsing circuits to permit connecting of said first delay means, said second delay means and said individual pulsing circuits, alternatively to a first or to a second group of outputs of said plurality of outputs from said generating means.

References Cited

UNITED STATES PATENTS 3,104,330  9/1963  Hamilton _____ 307—269 XR
3,386,038  5/1968  Johansen et al. __ 328—105 XR JOHN S. HEYMAN, Primary Examiner JOHN ZAZWORSKY, Assistant Examiner U.S. Cl. X.R.

307—261, 269; 328—29, 130, 180